(12) United States Patent
Hayter et al.

(10) Patent No.: US 10,044,455 B2
(45) Date of Patent: Aug. 7, 2018

(54) END-TO-END REAL-TIME TRANSPORT PROTOCOL (RTP) PACKET TRANSMISSION DELAY MEASUREMENT APPARATUS AND METHOD

(71) Applicant: AT&T MOBILITY IP, LLC, Atlanta, GA (US)

(72) Inventors: David Paul Hayter, Guildford (GB); Benoit Pasquereau, London (GB)

(73) Assignee: AT&T MOBILITY IP, LLC, Atlanta, GA (US)

(*) Notice: Subject to any disclaimer, the term of this patent is extended or adjusted under 35 U.S.C. 154(b) by 544 days.

(21) Appl. No.: 14/277,999

(22) Filed: May 15, 2014

(65) Prior Publication Data
US 2015/0333856 A1 Nov. 19, 2015

(51) Int. Cl.
| | |
|---|---|
| *H04J 3/06* | (2006.01) |
| *H04M 1/725* | (2006.01) |
| *H04L 29/06* | (2006.01) |
| *H04L 12/24* | (2006.01) |
| *H04L 12/26* | (2006.01) |

(52) U.S. Cl.
CPC .............. *H04J 3/06* (2013.01); *H04J 3/0667* (2013.01); *H04L 41/147* (2013.01); *H04L 43/0858* (2013.01); *H04L 65/1016* (2013.01); *H04L 65/608* (2013.01); *H04L 65/80* (2013.01); *H04M 1/725* (2013.01); *H04L 43/067* (2013.01); *H04L 43/106* (2013.01)

(58) Field of Classification Search
None
See application file for complete search history.

(56) References Cited

U.S. PATENT DOCUMENTS

| | | | |
|---|---|---|---|
| 6,738,349 B1* | 5/2004 | Cen ..................... | H04L 43/00 370/231 |
| 2003/0079005 A1* | 4/2003 | Myers .................. | H04L 45/04 709/223 |
| 2004/0062280 A1* | 4/2004 | Jeske ................... | H04J 3/0667 370/517 |
| 2008/0225747 A1* | 9/2008 | Bedrosian ............ | H04L 41/145 370/252 |
| 2009/0059798 A1* | 3/2009 | Lee ..................... | H04L 41/5009 370/241 |

* cited by examiner

*Primary Examiner* — Adnan Baig
(74) *Attorney, Agent, or Firm* — Workman Nydegger (57) ABSTRACT

In a wireless call between two mobile phones, metrics of conversational latency between the two parties determines a measure of Quality of Service (QoS) for the one or more carriers of real-time transport protocol RTP packets. Packages of metrics are collected at the two terminal devices, each of which may have an independent local clock. A Quality of Service estimation apparatus transforms metric packages into a pair of probability distribution functions for a plurality of real-time transport protocol packets between two endpoints. The offset between the two independent local clocks is determined or eliminated. A key performance indicator is determined for End-to-End RTP stream delay by transforming the timestamps associated with transmission and reception at user equipment hosting a QoS agent.

10 Claims, 4 Drawing Sheets

END-TO-END REAL-TIME TRANSPORT PROTOCOL (RTP) PACKET TRANSMISSION DELAY MEASUREMENT APPARATUS AND METHOD

CROSS-REFERENCES TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

Field of the Invention is wireless telephony using the IP Multimedia Subsystem (IMS) which applies the Real-time Transport Protocol (RTP) to carry Voice over IP (VoIP). A refinement, Voice over Long Term Evolution (VoLTE), utilizes high data rate cellular networks for full duplex voice calls with improved efficiency.

The class of the subject matter is within telecommunications and more specifically in diagnostic testing and measurement for evaluating the end-to-end condition of a cellular radiotelephone system having a transmitter and receiver at separate stations.

Description of the Related Art

Real-Time Transport Protocol

With Voice Over IP calls, voice is encoded and transmitted in RTP packets. If the transmission time of packets from one end to another is too long, the delay in hearing the other party makes users 'talk' over each other.

The RTP RFC-3550 describes the interarrival jitter which conventionally evaluates the quality of the voice call (if the jitter is too high, not enough packets arrive on time for the call quality to be good) but as it is computed for each end of the call, it does not measure the conversational latency or delay.

Conventionally, it is possible to evaluate the delay in a laboratory setting with test equipment but not possible to know the delay for actual customers of the mobile operator.

The generally accepted limit for good quality voice connection delay is 200 ms one-way or 250 ms as a limit. As delays rise over this threshold, talkers and listeners become uncomfortable, un-synchronized, and often they speak at the same time or both listen for the other to speak. This behavior is described as talker overlap. While the overall voice quality is acceptable, users subjectively evaluate the stilted nature of the conversation unacceptably annoying. Talker overlap is easily appreciated on international telephone calls when they travel over geosynchronous satellite connections because at the speed of light, satellite delay is in the order of 250 ms up and 250 ms down.

Conventional systems depend upon subjective user reported incidents and descriptions or objective networking statistics of packet loss and jitter. But combining these into a mean opinion score (MOS) leaves a gap for some aspects of user perception. One such tangible user perception is mouth-to-ear delay, also known as conversational latency, or duplex delay.

What is needed is a way to better measure the Quality of Service and Mean Opinion Score experienced by smartphone consumers. Reliable measurement of conversational latency or duplex delay in each direction would help adoption.

The unmet need is to evaluate the average end-to-end delay in transmitting voice, for calls performed on a live network. Mobile phone operators could detect issues with delay for IMS calls (even if they are not reported by users) and then investigate and fix the cause of the issues if this key performance indicator could be accurately estimated based on real data.

BRIEF SUMMARY OF THE INVENTION

In a wireless call between two mobile phones, metrics of conversational latency between the two parties determines a measure of Quality of Service for the one or more carriers of real-time transport protocol packets.

Two Quality of Service (QoS) mobile agents, each installed on an independent user device receives a tasking with a special profile so that metrics corresponding to RTP packets are collected; the devices then report to a QoS analytic platform; the QoS analytic platform processes the reports using the method described in this patent application and deduces the delay for the voice calls where both parties have been using a phone equipped with the QoS agent. Where a plurality of QoS agents are reporting, an analysis may distinguish wireless network components which need attention.

Packages of metrics are collected at the two terminal devices, each of which may have an independent local clock.

A Quality of Service estimation apparatus transforms metric packages into a pair of probability distribution functions for a plurality of real-time transport protocol packets between two endpoints.

The offset between the two independent local clocks is determined or eliminated by comparing the distribution of delays recorded in each direction. When a constant translation of one curve would result in substantially converging the two distribution curves together, it suggests that the clock domains are offset in that amount.

A currently contemplated key performance indicator is determined for End-to-End RTP stream delay by transforming the timestamps transmitted within each packet and the timestamps of the receiving QoS agents.

Advantageously, the Quality of Service may be analyzed between any two cellular base stations even when their clocks are not synchronized.

Advantageously, an nth percentile estimate may be determined for the offset between the two independent clocks.

This KPI describes the average end-to-end transmission delay of Real-time Transport Protocol packets between a first user equipment and a second user equipment.

The system includes a Quality of Service agent installed on a first user equipment, a Quality of Service agent installed on a second user equipment, and a Quality of Service estimation apparatus to receive and transform packages of metrics recorded by and transmitted from each of the Quality of Service agents mentioned above.

The pairs of user equipment in a call event are identified by signatures derived from the RTP packet headers.

Advantageously, an apparatus which can objectively measure the customer experience without the users having to verbalize or describe it helps an operator react faster when the call quality decreases and so helps keep customer satisfied and reduces churn. The delay for Voice IP calls was conventionally known when calls were placed in a laboratory setting, the delay can now be known for calls placed on the 'normal' operator network using standard phones.

BRIEF DESCRIPTION OF THE SEVERAL VIEWS OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 2:
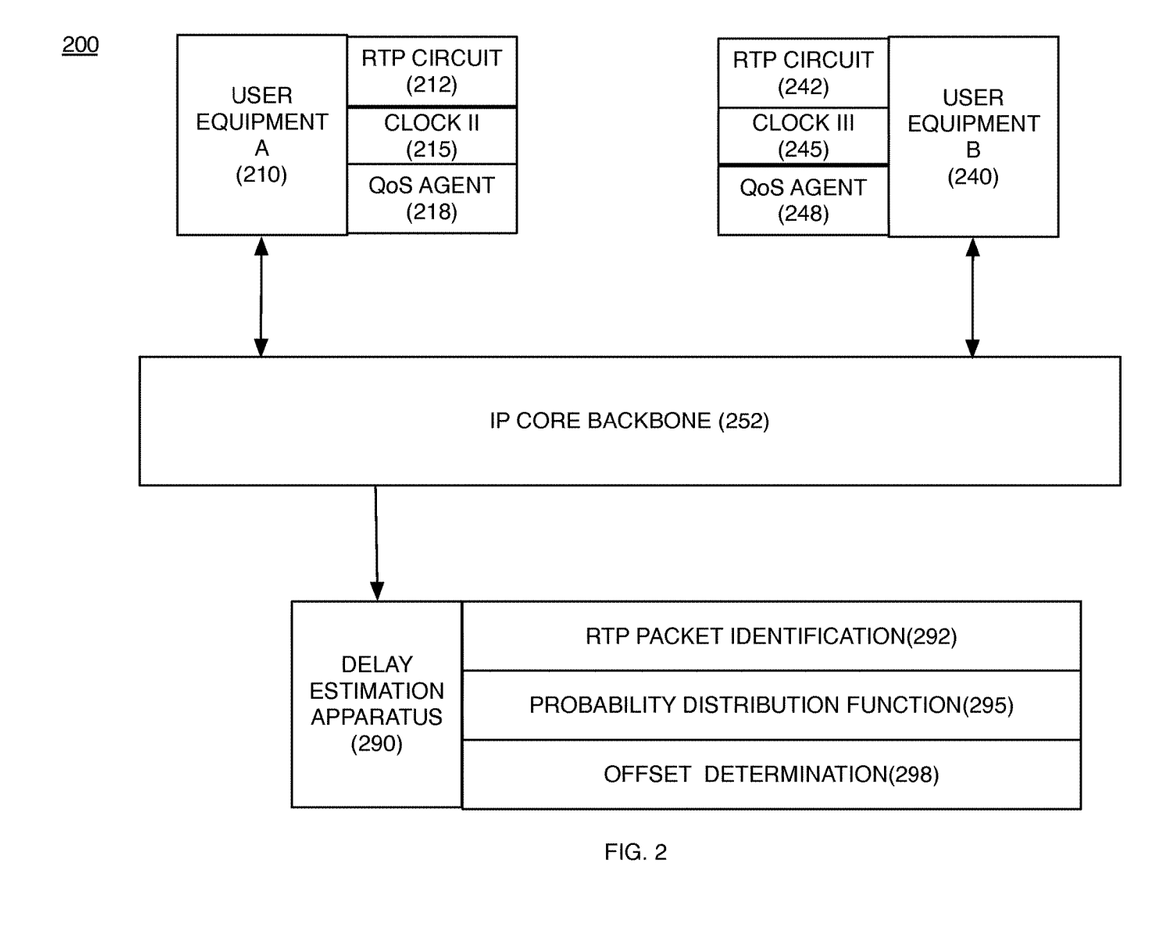
FIG. 2 is a block diagram of a system having an analysis apparatus communicatively coupled to a plurality of user equipments with installed Quality of Service agents.

FIG. 2 illustrates one embodiment of a system aspect of the present subject matter. An IP core backbone 252 transports RTP packets from user equipment A 210 to user equipment B 240. Each user equipment 210 240 comprises an RTP circuit 212 241 and a local clock 215 245. The subject matter of this patent application provides a delay estimation apparatus 290 which is communicatively coupled to a plurality of Quality of Service (QoS) agents 218 248 which are operatively installed within each of the user equipments 210 240. When RTP packets are generated and transmitted, a first QoS agent records and stores timestamps and packet signatures. When RTP packets are received, a second QoS agent records and stores timestamps and packet signatures. Packages are transmitted from each QoS agent to the delay estimation apparatus which comprises an RTP packet identification circuit 292; a probability distribution function circuit 295; and a clock domain offset determination circuit 298. Using these circuits the delay estimation apparatus transforms a plurality of packages received from the user equipments into a key performance indicator of the end-to-end delay between the two user equipments.

Figure 3:
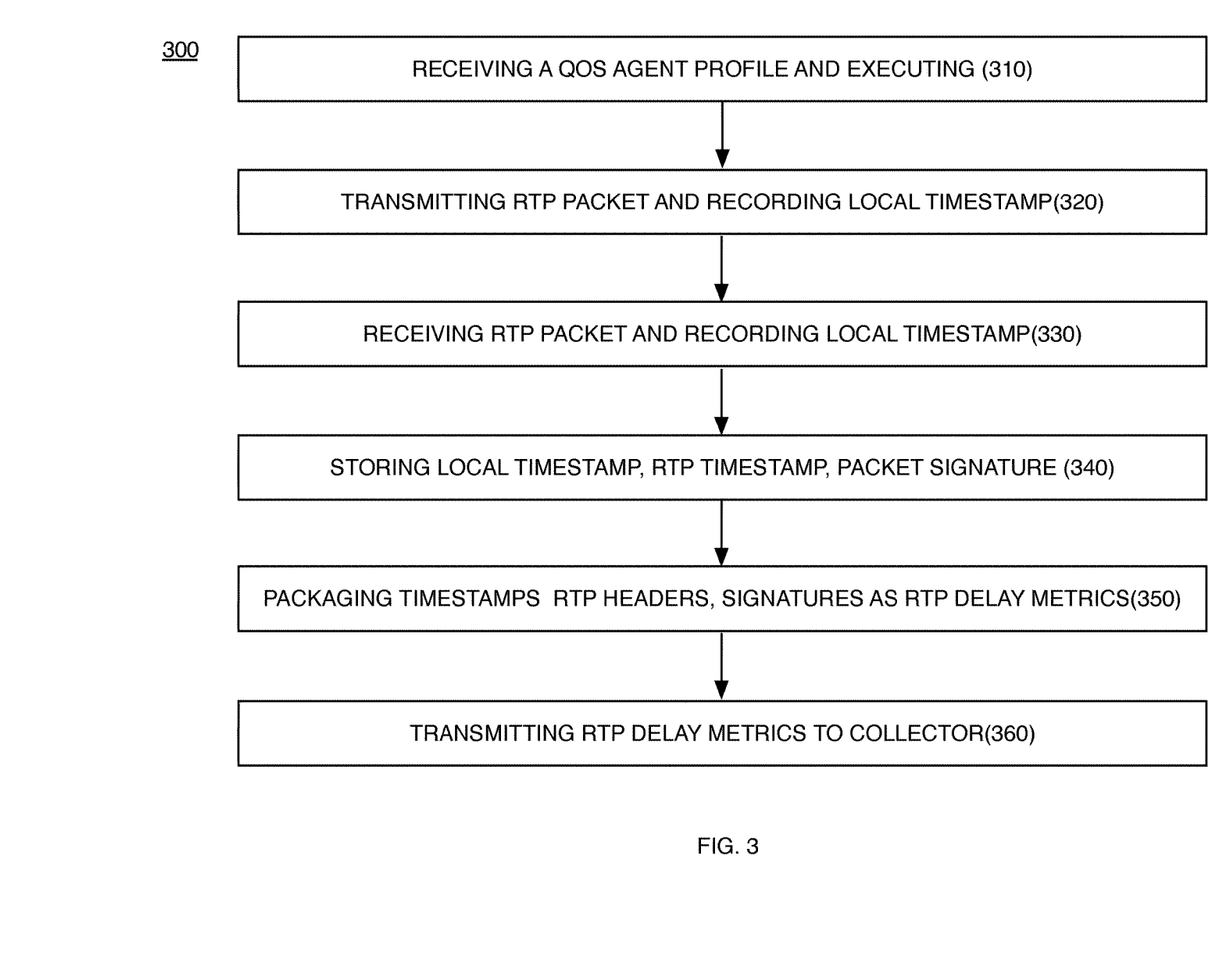
FIGS. 3-4 are flowcharts of steps in a method performed by a processor to control said apparatus and said agents.

FIG. 3 illustrates one embodiment of a method performed by a processor controlled by instructions encoded in non-transitory media to record and transform RTP delay measurements into an RTP metric package. The method steps include without limitation receiving a Quality of Service agent profile and executing the instructions within a user equipment 310; when transmitting an RTP packet, recording a local clock domain timestamp 320; when receiving an RTP packet, recording a local clock timestamp 330; storing said local timestamps along with RTP header fields including without limitation sequence number, source id, timestamp as a signature 340; packaging said timestamps, RTP header fields and signatures as RTP delay metrics 350; and transmitting said RTP delay metrics 360 to a collector specified in the profile for transformation into a key performance indicator by a delay estimation apparatus.

Figure 4:
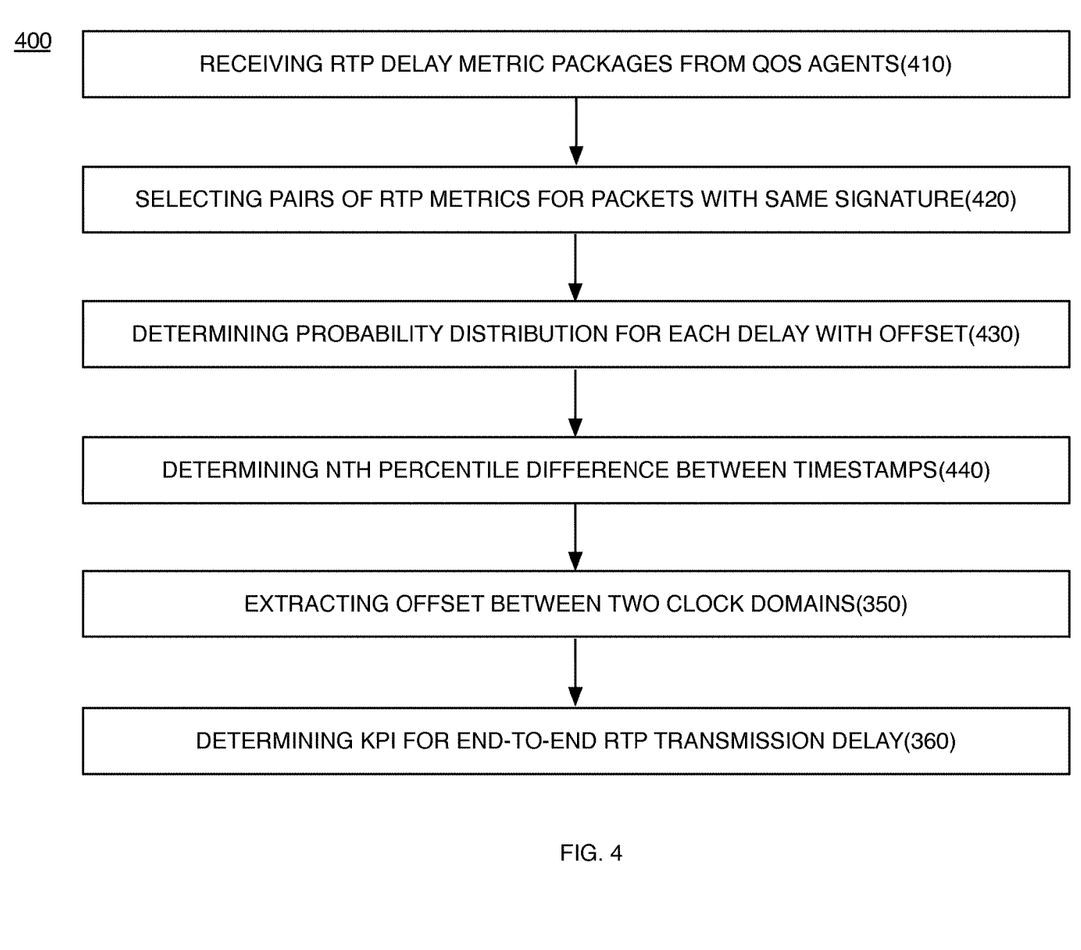

FIG. 4 illustrates one embodiment of a method performed by a processor controlled by instructions encoded in non-transitory media to transform RTP delay metric packages into a key performance indicator (KPI). The method steps include without limitation receiving RTP delay metric packages transmitted by QoS agents at a plurality of user equipments 410; selecting pairs of RTP metrics for packets with same signature, such as but not limited to the sequence number, 420; determining a probability distribution for each end-to-end delay with clock domain offset 430; determining an Nth percentile difference between timestamps 440; extracting the offset between the two clock domains 350; and determining a key performance indicator for end-to-end RTP packet transmission delay 360 in each direction of travel.

Delay in each direction of packet transmission is defined as the difference between a reception timestamp and a transmission timestamp corrected by a clock domain offset:

$$\text{delay}_A = t_{RP02A} - t_{RP01A} - \text{offset}$$

$$\text{delay}_B = t_{RP02B} - t_{RP01B} + \text{offset}$$

Delay A denotes an RTP packet transmission from user equipment A to user equipment B and delay B denotes a transmission from user equipment B to user equipment A In one embodiment the timestamps are stored, packaged, and transmitted by Quality of Service agents on each user equipment. In another embodiment, the timestamp for transmission is read from the RTP header by a Quality of Service agent on the receiving user equipment. In an other embodiment, the RTP receiver reads and records the local clock domain time and the RTP header timestamp.

$$\text{delay}_A + \text{delay}_B = (t_{RP02A} + t_{RP02B}) - (t_{RP01A} + t_{RP01B})$$

For each leg we compute the probability distribution function of the delay with offset:

$$\text{PDF}(\text{delay}_A + \text{offset}) = \text{PDF}(t_{RP02A} - t_{RP01A})$$

$$\text{PDF}(\text{delay}_B - \text{offset}) = \text{PDF}(t_{RP02B} - t_{RP01B})$$

Because we make the assumption based on experience, observation, and technology that clock domain offset is constant over the length of the call, the Probability Distribution Functions may be rewritten as a sum or difference:

$$\text{PDF}(\text{delay}_A) + \text{offset} = \text{PDF}(t_{RP02A} - t_{RP01A})$$

$$\text{PDF}(\text{delay}_B) - \text{offset} = \text{PDF}(t_{RP02B} - t_{RP01B})$$

In an embodiment, the method computes both PDFs, using the RP02A and RP01A with matching seqNum as well as RP02B and RP01B with matching seqNum. In an embodiment we match digital signatures which can be derived from selected RTP header fields: contributing source CSRC or synch source SSRC or timestamp or sequence number.

If it is desirable to distinguish forward delay from return delay, we may assume that the delay of the 10% percentile is the same for both legs (similarly the minimum and maximum delays are likely to be respectively equal to the minimum and maximum delay but we use the 10% percentage to avoid 'outliers')

$$\text{offset} = \frac{10\% \text{ Quantile}(t_{RP02A} - t_{RP01A}) - 10\% \text{ Quantile}(t_{RP02B} - t_{RP01B})}{2}$$

One aspect of the invention is a system comprising an end-to-end RTP delay estimation apparatus communicatively coupled to a first Quality of Service (QoS) recordation agent within a first user equipment and further coupled to a second QoS recordation agent within a second user equipment, each QoS recordation agent comprising a local clock timestamp reading circuit, and an RTP signature reading circuit, the end-to-end RTP delay estimation apparatus comprising an offset determination circuit and a RTP packet signature matching circuit.

In an embodiment, the Quality of Service recordation agent also includes: a data store for a local time stamp and an RTP packet signature; a metric packaging circuit; and a metric package transmission circuit.

In an embodiment, the end-to-end RTP delay estimation apparatus also includes: a probability distribution function determination circuit; an offset determination circuit; an RTP packet matching circuit; a delay determination circuit; and a key performance indicator transformation circuit.

Another aspect of the invention is a method at a Quality of Service (QoS) recordation agent, the method including: receiving a recordation agent profile containing executable instructions for performing; receiving an RTP packet and recording the local clock timestamp; storing the RTP packet header timestamp, the local clock timestamp, and an RTP packet signature as RTP delay metrics; packaging RTP delay metrics; and transmitting the RTP delay metrics package to a collector specified in the profile.

Another aspect of the invention is a method at an end-to-end RTP delay estimation apparatus, the method including: receiving a first RTP delay metric package from a first QoS recordation agent and a second RTP delay metric package from a second QoS recordation agent; selecting pairs of RTP metrics which correspond to sent and received RTP packets having the same RTP packet signature; determining a probability distribution function for each delay with offset; determining the offset between the two clock domains; and determining a key performance indicator for end-to-end RTP transmission delay.

In an embodiment, determining the offset between the two clock domains is done by dividing by two the difference between an Nth quantile of the transmit and receive timestamps in a first direction and an Nth quantile of the transmit and receive timestamps in a second direction. For various practical reasons, N can be chosen heuristically as a small number such as 10.

In an embodiment, the method determines End-to-End RTP Stream Delay by determining MEAN(SCALL.End-to-End RTP Transmission Delay)

where

End-to-End RTP Transmission delay is Average (RP02$A$.Timestamp–RP01$A$.Timestamp)–offset.

In this notation RP01A identifies a packet at transmission by user equipment A and RP02A identifies the same packet at reception from user equipment A. In one embodiment, the timestamps are generated by Quality of Service agents installed at the sender and at the receiver. In an other embodiment, the timestamps are generated by the RTP processes at the sender and at the receiver. In another embodiment, the RTP header timestamp is generated by the RTP process at the sender and the timestamp of reception is generated by a Quality of Service agent installed at the receiver. In no case is the payload of the RTP packet accessed or used for anything.

In one embodiment, the RTP packet signature includes a timestamp derived from the first octet in the RTP data packet, and a synchronization source identifier carried in the RTP header.

In another embodiment, the RTP packet signature includes a sequence number of an RTP packet, and a timestamp derived from the first octet in the RTP data packet.

In another embodiment, the RTP packet signature includes a sequence number of an RTP packet, a timestamp derived from the first octet in the RTP data packet, and a synchronization source identifier carried in the RTP header.

In an embodiment, the offset is determined by ($N$thPercentile(RP02$A$.Timestamp–
RP01$A$.Timestamp)–$N$thPercentile
(RP02$B$.Timestamp–RP01$B$.Timestamp))/2.

In an embodiment, the Nth Percentile is a tenth percentile.

In an embodiment, the apparatus transforms measurement packages from a plurality of user equipment into an estimate of duration in milliseconds of the average end-to-end RTP transmission delay of a RTP packet, to and from one user equipment to and from a second user equipment during one or more calls. In the case of a multiparty call, the transmission delay estimate will be the average for every point to point net.

In another embodiment of the invention, we model a plurality of users whose user equipments are synchronized with different clock domains I, II, III, etc. For any conversation between a call start event and a call end event, we expect an offset e.g. II-III.

We describe a conversation between Pat and Robin and RTP packets which initiate from Pat have RTP header fields Pat for Source and timestamps using RTP II as the reference. RTP packets which initiate from Robin have RTP header fields Robin for Source and timestamps using RTP III as the reference. Each user equipment has a Quality of Service (QoS) Agent which operates off the local clock domain. When Robin receives an RTP packet, the QoS Agent timestamps the reception using QoS III as the reference and when Pat receives an RTP packet, the QoS Agent timestamps the reception using QoS II as the reference.

Of course, if both user equipment are synchronized to the same clock, there is no offset. And for balanced pairs of packets in a single call where the number of packets from Pat to Robin and from Robin to Pat, the accumulated offsets will cancel out if we simply subtract the local clock timestamp from the RTP timestamp to calculate a roundtrip delay.

But averaging the delays in one direction from Pat to Robin or from Robin to Pat can only be useful if we have a way to determine an estimate for the offset during a conversation i.e. between call start and call end events.

Based on familiarity with the technology, the policies of the carriers and handset manufacturers, and measured observations of user behaviors, applicant asserts that choosing a 10th percentile of the distribution of delays provides an accurate estimate:

- packets going from UE A to UE B can take various routes, each route having a different delay
- similarly, packets going from UE B to UE A will also take various routes, again each having a different delay
- we make the assumption that the routes that go from UE A to UE B are the same as the routes that go from UE B to UE A. This assumption is justified because IP links are bidirectional.
- that means that if we have enough sample of delay for each direction, the distributions o_rx-tx and rx-o_tx should look similar
- So, by using the delay (before offset correction) from the same percentile for both direction, both delays should correspond to the same route, so can be used to deduce the offset However the principle of the invention does not depend on a specific value but upon the observation that such a peak in distributions is observable and can be used to exclude outlier data points.

In an embodiment, the RTP headers are used only to determine a signature to match an RTP packet transmitted to Robin with an RTP packet received by Robin and a signature to match an RTP packet transmitted to Pat with an RTP packet received by Pat.

At each user equipment, a QoS agent records a timestamp using the local clock domain and signature for each RTP packet transmitted and a timestamp using the local clock and signature for each RTP packet received. Each QoS agent packages and transmits the recorded metrics to the analysis apparatus.

A delay PR represents the delay for a packet transmitted from Pat and received by Robin. Delay PR equals the local clock timestamp II of the transmission minus the local clock timestamp III of the reception minus the offset between the two clock domains II-III. In the reverse direction of the conversation Delay RP equals the local clock III minus the local clock timestamp II plus the offset between the two clock domains II-III. Or, the delay from Pat to Robin plus the offset equals the difference between the timestamp of reception in domain III and the timestamp of transmission in domain II. The delay from Robin to Pat minus the offset equals the difference between the timestamp of reception in domain II and the timestamp of transmission in domain III. For an array of delay measurements reported by the QoS agents, the probability distribution function of delay PR plus offset equals the probability distribution function of timestamp III minus timestamp II for a plurality of RTP packets.

Because we assert that the offset is substantially a constant, it may be moved outside of the probability distribution function. Thus we may transform a plurality of packages of timestamps by determining the probability distribution function of the difference between sending and receiving timestamps and either adding or subtracting the offset.

Another assumption is that the delay of the Nth percentile from Pat to Robin is the same as the delay of the Nth percentile from Robin to Pat. Using this assumption of equality of delay in the two directions in the Nth percentile. In an embodiment, the apparatus transforms measured differences in delays into the offset between the clocks. In an embodiment, using the exemplary 10th percentile, the offset is estimated to be half the difference between two 10th percentiles, e.g. the 10% quantile of the difference in timestamps of packets transiting from Pat to Robin and the 10% quantile of the difference in timestamps of packets transiting from Robin to Pat.

CONCLUSION

The delay measurement of the present subject matter is complementary to and easily distinguished from the conventional interarrival jitter evaluation already presented in RFC 3550.

A call with a low jitter (relatively little variation in arrival time of RTP packets) can still be unintelligible and undelightful if the delay is too high. As an example, when you wait too long for the answer of your question, you start talking again and then the answer arrives, clear as a bell but while you are already in the middle of another sentence or question.

The techniques described herein can be implemented in digital electronic circuitry, or in computer hardware, firmware, software, or in combinations of them. The techniques can be implemented as a computer program product, i.e., a computer program tangibly embodied in non-transitory media, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Figure 1:
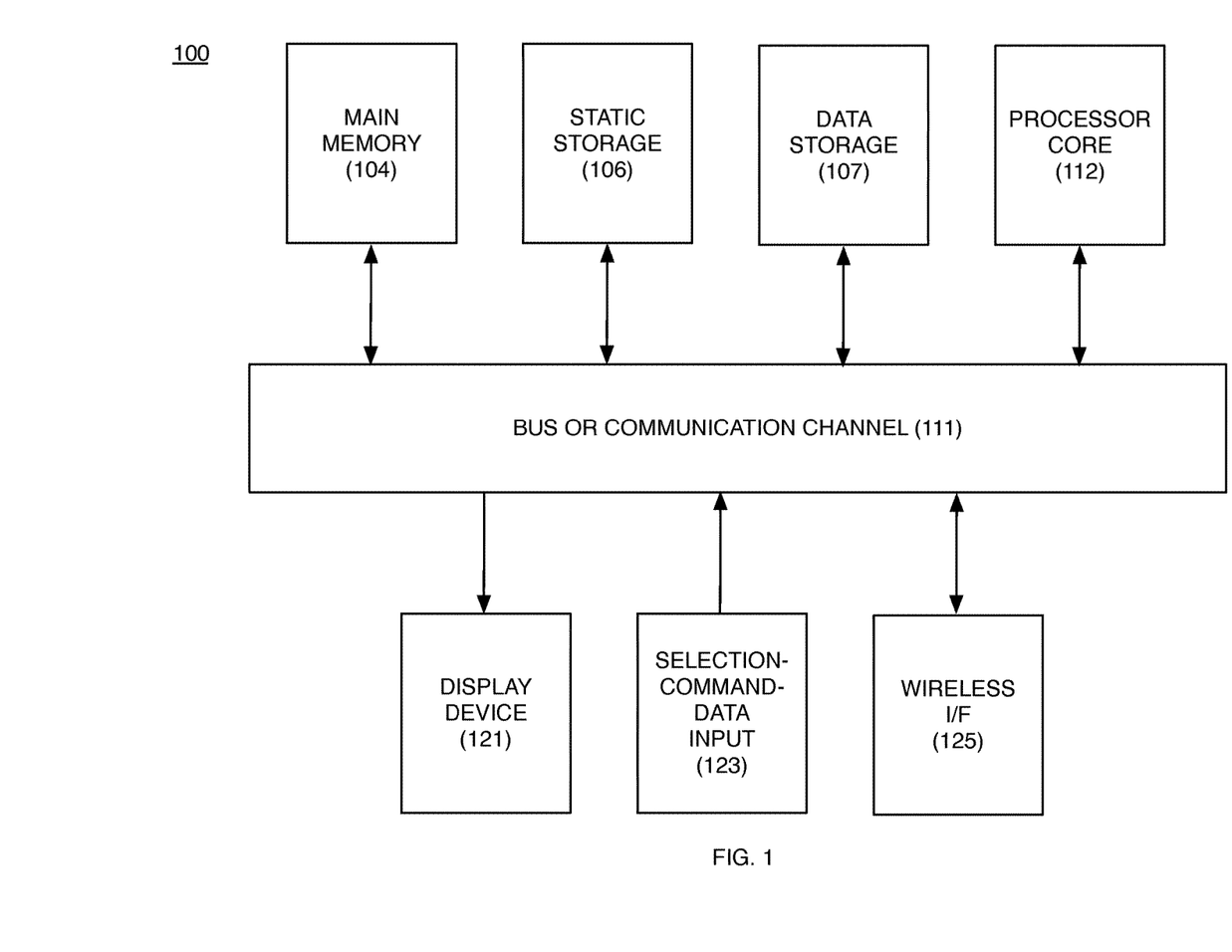
FIG. 1 is a block diagram of an exemplary processor that may be caused to perform one or more of the functions described herein directed by instructions encoded in non-transitory media which execute method steps in an apparatus.

FIG. 1 is a block diagram of an exemplary processor that may be used to perform one or more of the functions described herein. Referring to FIG. 1, processor 100 may comprise an exemplary client or server process. Processor 100 comprises a communication mechanism or bus 111 for communicating information, and a processor core 112 coupled with bus 111 for processing information. Processor core 112 comprises at least one processor core, but is not limited to a processor core, such as for example, ARM™, Pentium™, etc.

Processor 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor core 112.

Processor 100 also comprises a read only memory (ROM) and/or other static storage device 106 coupled to bus 111 for storing static information and instructions for processor core 112, and a non-transitory data storage device 107, such as a magnetic storage device or flash memory and its associated control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices 123 may be attached to bus 111 or a wireless network interface 125 for communicating selections and command and data input to processor core 112.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. A method, comprising:
   performing the following operations at an end-to-end Real-time Transport Protocol (RTP) delay estimation apparatus that includes an RTP packet identification circuit, a probability distribution function circuit, and a clock domain offset determination circuit;
   receiving a first RTP delay metric package from a first QoS recordation agent of a first mobile communication device that has a first independent local clock and receiving a second RTP delay metric package from a second QoS recordation agent of a second mobile communication device that has a second independent local clock, wherein the first RTP delay metric package and the second RTP delay metric package each include RTP metrics;
   selecting pairs of the RTP metrics which correspond to sent and received RTP packets identified by the RTP packet identification circuit as having the same RTP packet signature, wherein the RTP metrics are metrics of conversational latency between the first mobile communication device and the second mobile communication device;
   determining, with the probability distribution function circuit, a probability distribution function for a first RTP packet stream delay in a first transmission direction and determining, with the probability distribution function circuit, a probability distribution function for a second RTP packet stream delay in a second transmission direction, wherein the first RTP packet stream delay and the second RTP packet stream delay are identified by RTP metrics included in the first RTP delay metric package and in the second RTP delay metric package, respectively;
   extracting, with the clock domain offset determination circuit, based on the probability distribution functions, a clock domain offset between the first independent local clock and the second independent local clock;
   determining, as a function of the clock domain offset, a key performance indicator (KPI) for end-to-end RTP packet transmission delay, wherein the KPI describes an average end-to-end transmission delay of voice data between the first mobile communication device and the second mobile communication device; and
   based on the KPI, reducing the conversational latency when the conversational latency exceeds a predetermined threshold.

2. The method of claim 1 wherein the RTP packet signature comprises:
   a timestamp derived from the first octet in the RTP data packet, and
   a synchronization source identifier carried in the RTP header.

3. The method of claim 1 wherein the RTP packet signature comprises:
   a sequence number of an RTP packet, and
   a timestamp derived from the first octet in the RTP data packet.

4. The method of claim 1 wherein the RTP packet signature comprises:
   a sequence number of an RTP packet,
   a timestamp derived from the first octet in the RTP data packet, and
   a synchronization source identifier carried in the RTP header.

5. The method of claim 1 wherein the offset is determined by (NthPercentile(RP02A.Timestamp–RP01A.Timestamp)–NthPercentile(RP02B.Timestamp–RP01B.Timestamp))/2; wherein RP02A.Timestamp is recorded by the local clock at the 1st recipient, RPO1A.Timestamp is read from the RTP header(s) at the 1st recipient, RPO2B.Timestamp is recorded by the local clock at the 2nd recipient, and RPO1B.Timestamp is read from the RTP header(s) at the 2nd recipient.

6. The method of claim 1 wherein the Nth Percentile is a tenth percentile.

7. The method of claim 1 wherein determining a probability distribution function for each of the first and second stream delay comprises: determining a probability distribution function of the difference between a reception timestamp at first clock domain and a transmission timestamp at a second clock domain and adding or subtracting from said probability distribution function an offset.

8. The method of claim 1 wherein determining a probability distribution function for each of the first and second stream delay comprises: determining a probability distribution function of the difference between a reception timestamp at first clock domain and a transmission timestamp within an RTP packet header at a second clock domain and adding or subtracting from said probability distribution function an offset.

9. The method of claim 1 wherein the voice data comprises RTP packets.

10. A non-transitory storage medium having stored therein computer-executable instructions which, when executed by one or more hardware processors, perform the following operations at an end-to-end Real-time Transport Protocol (RTP) delay estimation apparatus that includes an RTP packet identification circuit, a probability distribution function circuit, and a clock domain offset determination circuit:

receiving a first RTP delay metric package from a first QoS recordation agent of a first mobile communication device that has a first independent local clock and receiving a second RTP delay metric package from a second QoS recordation agent of a second mobile communication device that has a second independent local clock, wherein the first RTP delay metric package and the second RTP delay metric package each include RTP metrics;

selecting pairs of the RTP metrics which correspond to sent and received RTP packets identified by the RTP packet identification circuit as having the same RTP packet signature, wherein the RTP metrics are metrics of conversational latency between the first mobile communication device and the second mobile communication device;

determining, with the probability distribution function circuit, a probability distribution function for a first RTP packet stream delay in a first transmission direction and determining, with the probability distribution function circuit, a probability distribution function for a second RTP packet stream delay in a second transmission direction, wherein the first RTP packet stream delay and the second RTP packet stream delay are identified by RTP metrics included in the first RTP delay metric package and in the second RTP delay metric package, respectively;

extracting, with the clock domain offset determination circuit, based on the probability distribution functions, a clock domain offset between the first independent local clock and the second independent local clock;

determining, as a function of the clock domain offset, a key performance indicator (KPI) for end-to-end RTP packet transmission delay, wherein the KPI describes an average end-to-end transmission delay of voice data between the first mobile communication device and the second mobile communication device; and based on the KPI, reducing the conversational latency when the conversational latency exceeds a predetermined threshold.

* * * * *